United States Patent [19]

Yamaguchi et al.

[11] Patent Number: 4,995,470
[45] Date of Patent: Feb. 26, 1991

[54] CONTROL APPARATUS FOR HYDRAULIC CONTINUOUSLY VARIABLE SPEED TRANSMISSION

[75] Inventors: Kouji Yamaguchi, Saitama; Kazuya Maki, Aichi, both of Japan

[73] Assignee: Honda Giken Kogyo Kabushiki Kaisha, Tokyo, Japan

[21] Appl. No.: 259,877

[22] Filed: Oct. 19, 1988

[30] Foreign Application Priority Data

Oct. 22, 1987 [JP] Japan .................. 62-267436

[51] Int. Cl.$^5$ .......................................... B60K 17/10
[52] U.S. Cl. .................................... 180/197; 60/487; 180/242
[58] Field of Search ............... 180/197, 6.48, 242, 180/165; 60/418, 487

[56] References Cited

U.S. PATENT DOCUMENTS

| | | | |
|---|---|---|---|
| 3,496,803 | 2/1970 | Whelahan | 74/843 |
| 3,641,765 | 2/1972 | Hancock et al. | 180/242 X |
| 3,913,697 | 10/1975 | Greene | 180/14.3 |
| 4,122,732 | 10/1978 | Chana | 74/863 |
| 4,158,290 | 6/1979 | Cornell | 60/445 |
| 4,203,290 | 5/1980 | Burckardt | 180/6.48 X |
| 4,236,595 | 12/1980 | Beck et al. | 180/197 X |
| 4,337,587 | 7/1982 | Presley | 37/83 |
| 4,395,878 | 8/1983 | Morita et al. | 180/6.48 X |
| 4,399,886 | 8/1983 | Pollman | 180/242 X |
| 4,478,134 | 10/1984 | Kawahara et al. | 91/488 |
| 4,484,655 | 11/1984 | Sheppard, Sr. | 180/308 |
| 4,503,928 | 3/1985 | Mallen-Herrero et al. | 180/165 X |
| 4,745,748 | 5/1988 | Hayashi et al. | 60/489 |

FOREIGN PATENT DOCUMENTS

| | | | |
|---|---|---|---|
| 120555 | 10/1984 | European Pat. Off. | 180/197 |
| 0226844 | 7/1987 | European Pat. Off. . | |
| 0240178 | 10/1987 | European Pat. Off. . | |
| 2535762 | 2/1976 | Fed. Rep. of Germany | 180/242 |
| 2547670 | 4/1977 | Fed. Rep. of Germany | 180/242 |
| 55-1290 | 1/1980 | Japan . | |
| 56-95722 | 8/1981 | Japan . | |
| 57-76357 | 5/1982 | Japan . | |
| 57-76358 | 5/1982 | Japan . | |
| 58-149459 | 9/1983 | Japan . | |
| 61-37540 | 2/1986 | Japan . | |
| 62-29420 | 2/1987 | Japan . | |
| 258822 | 11/1987 | Japan | 180/197 |
| 8001668 | 8/1980 | World Int. Prop. O. | 180/242 |

Primary Examiner—Mitchell J. Hill
Attorney, Agent, or Firm—Lyon & Lyon

[57] ABSTRACT

In a continuously variable speed transmission having a hydraulic pump, a hydraulic motor, a hydraulic closed circuit hydraulically connecting the pump with the motor, a control apparatus has a slip sensor for detecting slip of the driving wheels and a hydraulic control apparatus for lowering hydraulic pressure in the hydraulic closed circuit in accordance with magnitude of the slip of the wheels in such a way that the driving force of the driving wheels is reduced so as to be less than a slip limit force, the slip of the driving wheels being increased when the driving force applied to the driving wheels exceeds the slip limit force.

9 Claims, 3 Drawing Sheets

CONTROL APPARATUS FOR HYDRAULIC CONTINUOUSLY VARIABLE SPEED TRANSMISSION

BACKGROUND OF THE INVENTION

The invention relates to a hydraulic continuously variable speed transmission composed of a hydraulic pump and a hydraulic motor, and more particularly to a control apparatus for such variable speed transmission mounted on a vehicle.

There have been proposed various types of hydraulic continuously variable speed transmissions (see, for example, Japanese Patent Laid-Open Publication No. 56(1981)-95722); wherein the transmission comprises a constant displacement hydraulic pump driven by an engine and a variable displacement hydraulic motor driven by hydraulic pressure supplied through a hydraulic circuit from the hydraulic pump to transmit the rotation to the wheels. The transmissions are adapted to continuously vary the transmitted engine speed to the wheels by controlling the displacement of the hydraulic motors.

In such hydraulic continuously variable speed transmissions, the driving torque acting on the wheels depends on the hydraulic pressure generated in the hydraulic circuit and on the displacement of the hydraulic motor (i.e., the reduction ratio). This hydraulic pressure in the hydraulic circuit is limited only by a relief valve within a range below a given maximum pressure (relief hydraulic pressure). If the pressure is below this relief hydraulic pressure, the hydraulic pressure in the hydraulic circuit is determined in accordance with the driving load of the wheels.

Therefore, when for example, driving on a road having a low frictional coefficient, if the torque on a wheel exceeds the driving load (the gripping force of wheels) that is determined by the frictional coefficient between the road and the wheel, the wheel receiving that driving torque will slip and the driving (gripping) force thereof will be reduced, and as, a result, the vehicle will not be able to acquire necessary driving force or acceleration. This problem occurs not only in driving the wheels by the engine but also in decelerating the vehicle with engine braking.

SUMMARY OF THE INVENTION

An object of the invention is to provide a control apparatus capable of preventing the slip of the wheels and resultant reduction of the driving forces thereof of a vehicle equipped with a continuously variable speed transmission.

Another object of the invention is to provide a control apparatus capable of suppressing the driving forces on the wheels within a slip limit.

A further object of the invention is to provide a control apparatus capable of preventing the slip of the wheels as the engine power is transmitted to the wheels.

A still further object of the invention is to provide a control apparatus capable of preventing the slip of the wheels in decelerating a vehicle with engine braking.

In order to accomplish the above objects, the control apparatus according to the invention comprises a slip sensor, and a hydraulic pressure control means for controlling the hydraulic pressure in the hydraulic circuit so as to reduce the driving force of the wheels less than the slip limit of the wheels in response to the magnitude of the slip detected by the sensor.

The engine speed is transmitted to the wheels through a continuously variable speed transmission comprising a hydraulic pump and a hydraulic motor. The control apparatus functions in such a way that when the driving force exceeds the driving load determined by the frictional force (the tire's gripping force) between the wheels and the road surface causing slip of the wheels, the slip is sensed by the slip sensor, according to which the hydraulic pressure in the hydraulic circuit is lowered to reduce the driving force of the wheels, suppressing the slip.

Further scope of the applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein,.

DESCRIPTION OF THE PREFERRED EMBODIMENTS

Figure 1:
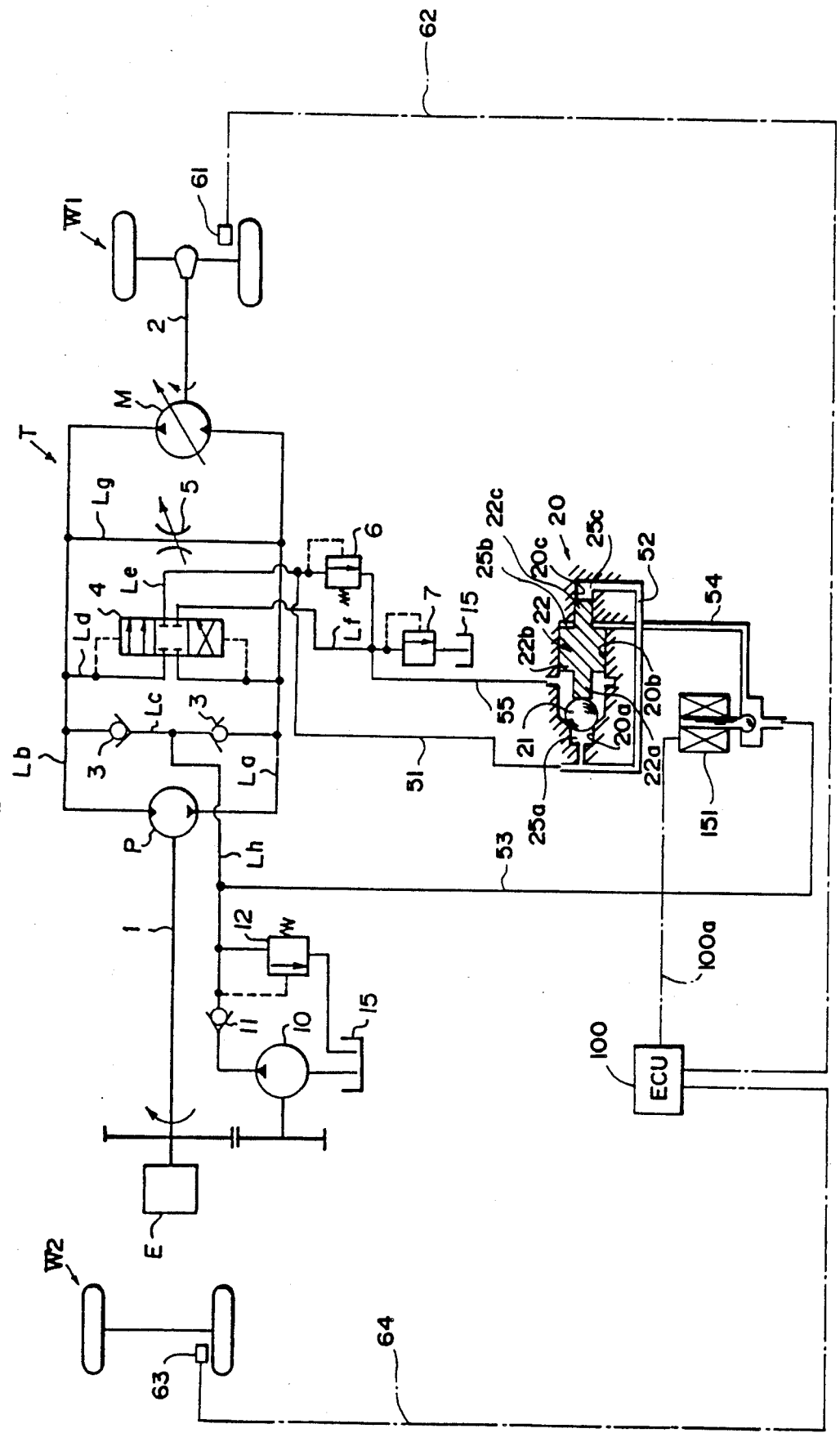
FIG. 1 is a schematic diagram of the hydraulic circuit of a continuously variable speed transmission in accordance with the invention.

FIG. 1 shows a hydraulic circuit diagram of a continuously variable speed transmission provided with a control apparatus, according to the present invention. The continuously variable speed transmission has a constant displacement hydraulic pump P driven by the engine E through the input shaft 1 and a variable displacement hydraulic motor M connected to the output shaft 2 driving the wheels $W_1$. These hydraulic pump and motor P and M constitute a closed hydraulic circuit along with two hydraulic lines: the first hydraulic line La by which the delivery port of the pump P communicates with the suction port of the motor M, and the second hydraulic line Lb by which the suction port of the pump P communicates with the delivery port of the motor M.

A charge pump 10 driven by the engine E is connected to the closed circuit through a charge hydraulic line Lh having a check valve 11 and through a third hydraulic line Lc having a pair of check valves 3 and 3. Hydraulic oil pumped up by the charge pump 10 from an oil sump 15 with its pressure regulated by a charge pressure relief valve 12 is supplied to a lower pressure side of the aforesaid hydraulic lines La and Lb through the check valves 3 and 3. The internal pressure of the first line La is high when the engine E drives the wheels $W_1$ through the pump P and the motor M (and the internal pressure of the second line Lb is low at this time). On the other hand, the internal pressure of the second line Lb is high when the engine E is driven by the wheels $W_1$ creating engine braking phenomenon (and the internal pressure of the first line La is low at this time). The engine braking phenomenon occurs during a deceleration state of the vehicle, for example.

A fourth hydraulic line Ld having a shuttle valve 4 is connected to the aforesaid closed circuit. To the shuttle valve 4 is connected a fifth hydraulic line Le and a sixth hydraulic line Lf which respectively have a high pressure relief valve 6 and a low pressure relief valve 7 and are inserted into the oil sump 15. The shuttle valve 4 is a 2-port, 3-position selector valve, which operates in response to a hydraulic pressure difference of the first and second hydraulic lines La, Lb to connect either of the first or second hydraulic lines La, Lb having a higher pressure to the fifth hydraulic line Le as well as to connect the other having a lower pressure to the sixth hydraulic line Lf. Therefore, the relief hydraulic pressure of a higher pressure-side line is regulated by the high pressure relief valve 6, and the relief hydraulic pressure of the other, lower pressure-side line is regulated by the low pressure relief valve 7.

Between the first and second hydraulic lines La and Lb is provided a seventh hydraulic line Lg to short cut the first and second hydraulic lines. The seventh hydraulic line Lg is provided with a clutch valve 5, a variable throttle valve to control the opening degree or hydraulic resistance of the line. Therefore, the throttle control of the clutch valve 5 can effect clutch control to control the transmission of driving force from the hydraulic pump P to the hydraulic motor M.

The engine E drives the hydraulic pump P, the hydraulic pressure generated by the pump P drives the hydraulic motor M for rotation which is transmitted to the wheels $W_1$ through the output shaft 2 to drive the wheels $W_1$. The hydraulic motor M can be, for example, a swash plate type axial piston motor which permits the speed reduction ratio of the continuously variable speed transmission T to be steplessly changed by controlling the tilt angle of the swash plate.

The fifth hydraulic line Le of the hydraulic closed circuit into which a high-pressure fluid is introduced is connected via a hydraulic line 51 with a pressure control valve 20 which is used as a means for controlling the hydraulic pressure.

The control valve 20 is composed of a ball 21, a spool 22, and a housing in which the ball 21 and the spool 22 are inserted. The housing has a first cylindrical hole 20a having a diameter of $D_1$ forming a first hydraulic chamber 25a, a second cylindrical hole 20b having a diameter of $D_2$ into which the central large-diameter portion 22b of a spool 22 is inserted and a third cylindrical hole 20c having a diameter of $D_3$ for receiving therein the right, small-diameter portion 22c of spool 22. The ball 21 has a larger diameter than the first cylindrical hole 20a, and is arranged to the right of this first cylindrical hole 20a in opposition thereto. To the right end of the ball 21, the left end 22a of the spool 22 is opposed.

Accordingly, as the ball 21 is abutted against the right end of the first cylindrical hole 20a, the right end of the first hydraulic chamber 25a is shut by the ball 21.

Between the right end surface of the central large-diametrical portion 22b of the spool 22 inserted in the second cylindrical hole 20b and the housing is formed a second hydraulic chamber 25b. Between the right end surface of the right small-diameter portion 22c of spool 22 inserted in the third cylindrical hole 20c and the housing is formed a third hydraulic chamber 25c. The first hydraulic chamber 25a and the third hydraulic chamber 25c communicate with a hydraulic line 51 which is connected via the shuttle valve 4 with the first hydraulic line La when the pressure in the first hydraulic line La is high. while the second hydraulic chamber 25b is connected with a solenoid valve 151 through a hydraulic line 54. Here it should be understood that the solenoid valve 151 is used for controlling, in response to the duty ratio signal sent from a controller 100, the communication between the charge hydraulic line 53 branching from a charge hydraulic line Lh which is pressure-controlled by the charge pressure relief valve 12, and a hydraulic line 54 connected with said second hydraulic chamber 25b. The valve 151 is a normal-open type valve which is opened when the duty ratio is 0% but fully closed when the duty ratio is 100%.

Consequently, a rightward force Fa acts on the ball 21. The rightward force Fa is produced by a hydraulic pressure Pa, the pressure Pa being supplied from the first hydraulic line La into the first hydraulic chamber 25a through the hydraulic line 51. An equation for the rightward force Fa is:

$$Fa = Pa * Aa$$

where $Aa = (\pi/4) * D_1^2$ and "Aa" represents a cross-sectional area of the first hydraulic chamber. A leftward force Fb acts on the spool 22. The leftward force Fb is produced by a hydraulic pressure Pb, the pressure Pb being supplied into the second chamber 25 through the hydraulic line 54. The pressure Pb is controlled by the solenoid valve 151. An equation for the leftward force Fb is:

$$Fb = Pb * Ab$$

where $Ab = (\pi/4) * (D_2^2 - D_3^2)$ and "Ab" represents a cross-sectional area of the second hydraulic chamber. A leftward force Fc also acts on the spool 22. An equation for the leftward force Fc is:

$$Fc = Pa * Ac$$

where $Ac = (\pi/4) * D_3^2$ and "Ac" represents a cross sectional area of the third hydraulic chamber.

As understood from the foregoing description, the hydraulic pressure acting on the ball 21 and the spool 22 balances when Fa=Fb+FC, but the ball 21 is pushed to the right when Fa>Fb+Fc making the hydraulic line 51 communicate with a sixth hydraulic line Lf which is pressure-controlled by a low-pressure relief valve 7. Hence when Fa>Fb+Fc, the fluid in the first hydraulic line La (when the pressure in line La is high) flows into the sixth hydraulic line Lf through the line 51, pressure-control valve 20 and line 55' to lower the pressure in the first hydraulic line La.

We will now discuss equilibrium equation Fa=Fb+Fc below. This equation, when expressed in terms of the cross sectional areas of each hydraulic chamber and the pressure in it, reads $$Pa*Aa = Pb*Ab + Pa*Ac$$

which is, upon rearrangement, equivalent to $$Pa*(Aa-Ac)=Pb*Ab \tag{1}$$

From this equation we see that by controlling the pressure Pb in the second hydraulic chamber 25b, the magnitude $P_H$ of the pressure Pa required for attaining the above equilibrium can be set in the first and third hydraulic chambers 25a and 25c, respectively, through the hydraulic line 51. When the pressure Pa in the first hydraulic chamber 25a becomes higher then $P_H$, the ball 21 is pushed to the right to connect the hydraulic line 51 with line 55. As a result of this, the pressure in the line 51, i.e., the pressure Pa in the first hydraulic line La (when line La is connected to the fifth hydraulic line Le), will never exceed the preset pressure $P_H$, which is the relief hydraulic pressure for the first hydraulic line La.

It is noted that the hydraulic pressure Pb in the second hydraulic chamber 25b can be controlled by the duty ratio control of the solenoid valve 151, and hence that by giving the duty ratio signals generated in the controller 100 to the solenoid valve 151 through the line 100a, the maximum hydraulic pressure (relief hydraulic pressure) $P_H$ can be controlled.

Figure 2:
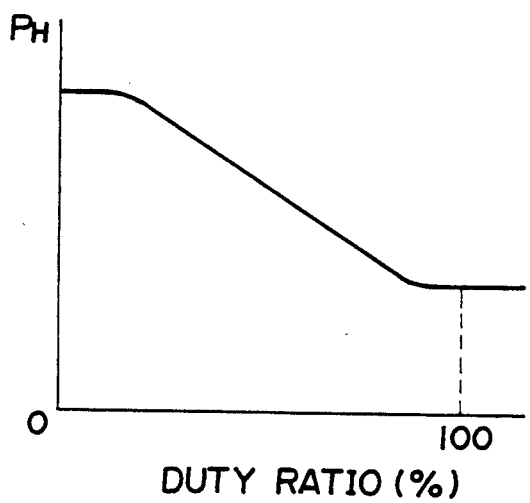
FIGS. 2 and 3 are graphs showing the relationship between the duty ratio of the solenoid valve of the above control apparatus and the relief hydraulic pressure $P_H$, and the relationship between the slip ratio and the duty ratio, respectively.

Details of the operations in controlling the relief hydraulic pressure in the first hydraulic line La will be now described below. The relief hydraulic pressure $P_H$ is set to be maximum when the duty ratio is 0% in response to the duty ratio signal from the controller 100, as shown in FIG. 2, and minimum when the duty ratio is 100%.

Figure 4:
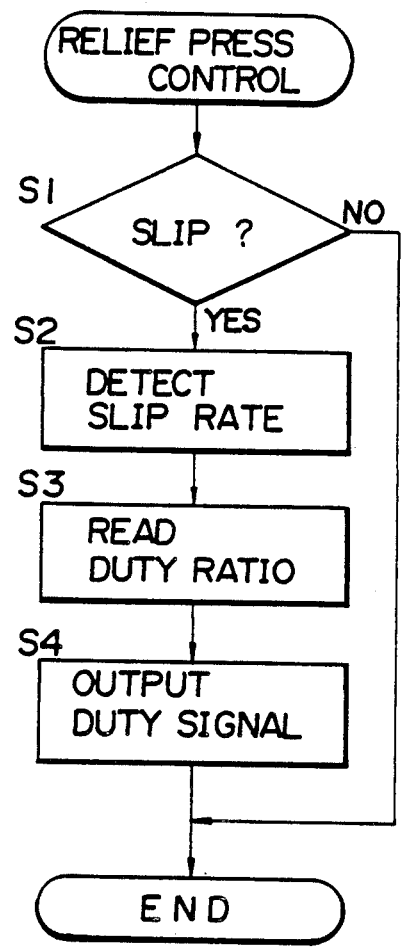
FIG. 4 is a flow chart of the control of the control apparatus.
Figure 3:
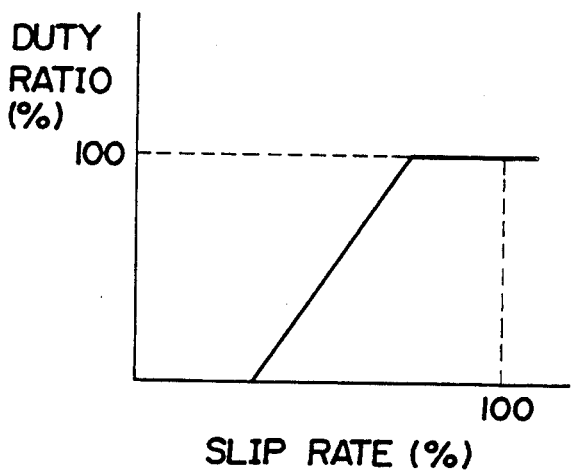

This duty ratio control is effected to suppress the slip of the wheels when the driving force of the wheels exceeds the driving load (the gripping force of the wheel tires) as determined by the frictional forces between the wheel tires and the road surface. The driving load therefore sets a limiting driving force of the wheels, also known as a slip limit force. If the driving force of the wheels exceeds this slip limit force, then the wheels will slip, as discussed. To do this (as shown in FIG. 4), slip is detected (if any) (S1) and a slip rate thereof is determined (S2). As shown in FIG. 1 the rotational speed of driving wheels driven by the hydraulic motor M is detected by a first speed sensor 61, the detection signal from which is transmitted through a line 62 to the controller 100. The rotational speed of free-rotation wheels $W_2$ is detected by a second speed sensor 63, whose detection signal is also transmitted to the controller 100 through a line 64. When the driving wheel $W_1$ slips, there will be produced a difference in rotational speed between the wheels $W_1$ and $W_2$, from which the slip rate is calculated in the controller 100.

Based on the slip rate found in this way, a duty ratio is set (S3) in correspondence to a magnitude of the slip rate, the ratio being greater for a greater slip ratio, and a signal indicative of the duty ratio is output to the solenoid valve 151 (S4). This lowers the hydraulic pressure in the first hydraulic line La, lowering the driving force of the driving wheels $W_1$ to suppress the slip thereof. Namely, the slip of a driving wheel W, is suppressed because the hydraulic pressure in the first hydraulic line La (connected to the fifth hydraulic line Le through the shuttle valve 4) is reduced by the action of a pressure control valve 20 to lower the driving force to be less than the slip limit force thereof.

Although the above description refers to the slip control operation for suppressing the slip of the driving wheel $W_1$ (driven by the engine) by controlling the hydraulic pressure in the first hydraulic line La by means of the hydraulic control valve 20, similar control will be carried out when the driving wheel $W_1$ slips caused by the high pressure in the second hydraulic line Lb due to engine braking during deceleration. During such engine braking, the second hydraulic line will be connected to the fifth hydraulic line Le through the shuttle valve 4, due to the high pressure in the second hydraulic line Lb.

In the above example, the hydraulic pressure control valve 20 is used as a means of controlling the hydraulic pressure. However, the invention is not limited by the above example: similar control may also be provided by a clutch valve 5 disposed in a seventh hydraulic line Lg short circuiting the first and second hydraulic lines La and Lb. Such a clutch valve as this will be described below by way of second example.

Figure 5:
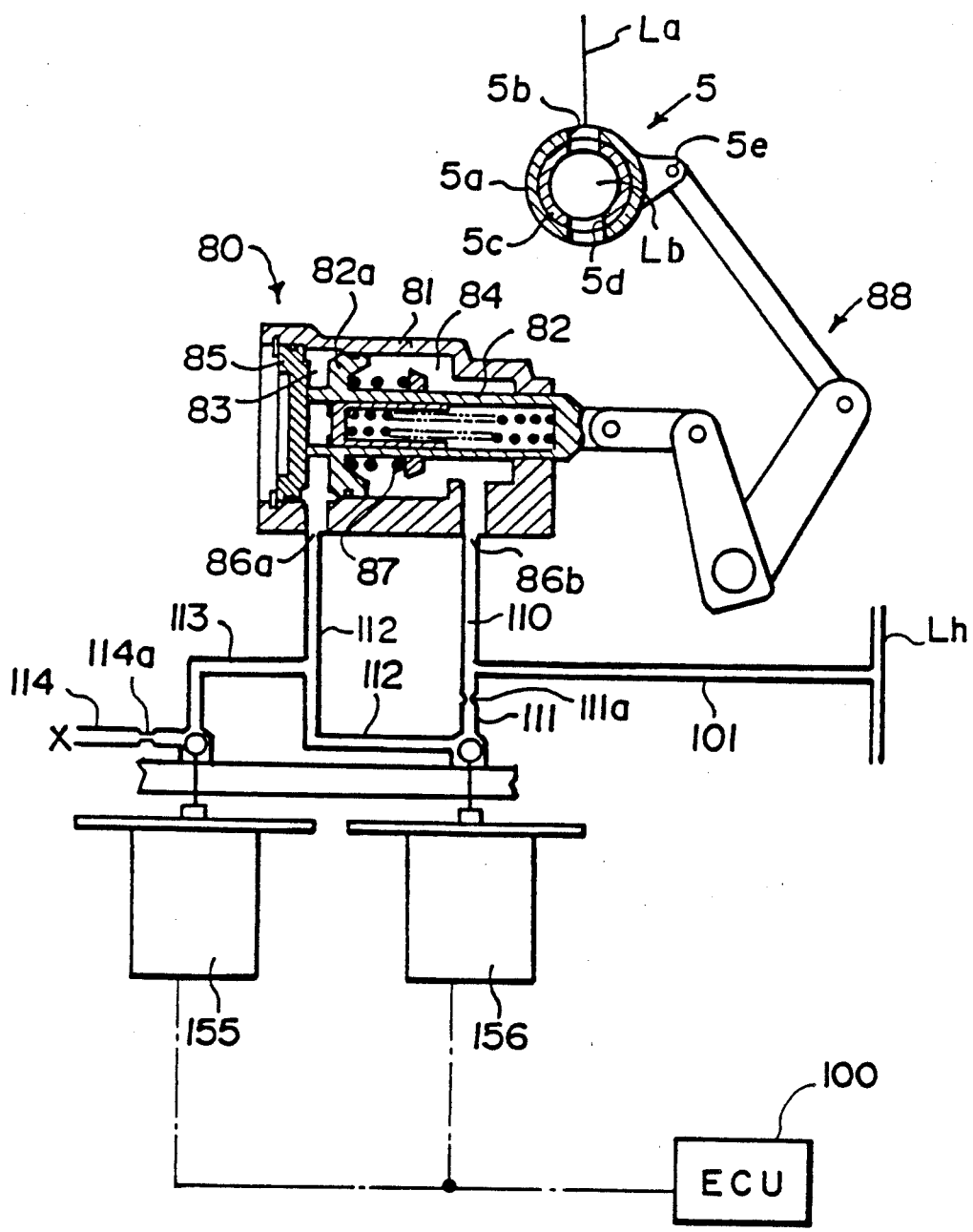
FIG. 5 is a cross sectional view of a clutch valve and a servo unit used in the hydraulic pressure control for the second embodiment according to the invention.

The constitution and operation of the clutch valve 5 are as follows:

The clutch servo unit 80, as shown in FIG. 5, comprises a cylinder member 81, a piston member 82 inserted in the cylinder member 81 slidably to the right and left (as shown in FIG. 2), a cover member 85 fixed to cover the cylinder chamber into which the piston member 82 is inserted, and a spring 87 pushing the piston member 82 to the left (in FIG. 2). A piston 82a on the piston member 82 divides the cylinder member 81 into a left cylinder chamber 83 and a right cylinder chamber 84, to which hydraulic lines 112 and 110 are respectively connected via respective ports 86a and 86b.

The hydraulic oil in the hydraulic line 110 is transferred from the charge pump 10 (whose delivery pressure is regulated by the charge pressure relief valve 12) through a hydraulic line 101, while the hydraulic oil in the hydraulic line 112 is transferred from the hydraulic line 101 through a hydraulic line 111, when the hydraulic oil is diverged into the line 111, and passes through an orifice 111a in the line 111. Hydraulic oil pressure in the line 112 is controlled by two duty-ratio-controlled solenoid valves 155 and 156. Here, the solenoid valve 156 is provided to control the flow rate of the hydraulic oil flowing from the line 111 (having the orifice 111a therein) to the line 112 based on the duty ratio signals, while the solenoid valve 155 is disposed between a hydraulic line 113 diverging from the line 112 and a hydraulic line 114 which communicates with the drain through an orifice 114a, to control the flow of the hydraulic oil from the line 113 to the drain, based on the duty signals.

Therefore, to the right cylinder chamber 84 via the line 110 is applied the charge pressure regulated by the charge pressure relief valve 12, while to the left cylinder chamber 83 is applied a pressure from the line 112 lower than the charge pressure, by the action of the aforesaid two solenoid valves 155 and 156. In this connection, the force applied on the piston member 82 from the right side (that is, a force due to the hydraulic pressure P1 in the right cylinder chamber 84 plus the force of the spring 87) balances with the force applied on the piston member 82 from the left side (that is, a force due to the hydraulic pressure P2 in the left cylinder chamber 83), even when P2 is lower than P1, because the area of the right cylinder chamber 84 subject to oil pressure is designed to be much smaller than that of the left cylinder chamber 83. Therefore, if the solenoid valves 155 and 156 control the hydraulic pressure (in the left cylinder chamber 83) supplied from the line 112 so as to be larger than the pressure P2, the piston member 82 will be moved to the right, while when the solenoid valves 155 and 156 control the hydraulic pressure in the left cylinder chamber 83 supplied from the line 112 so as to be smaller than the pressure P2, the piston member 82 will be moved to the left.

The movement of the piston member 82 to the left or right is transmitted to the clutch valve 5 through a link 88. The clutch valve 5 consists of a stationary member 5a having a first valve port 5b therein, and a rotary member 5c having a second valve port 5d rotatably inserted in the stationary member 5a. An arm 5e engaging with the rotary member 5c is connected to the aforesaid link 88, thus allowing a rotation of the rotary member 5c in accordance with the movement of the aforesaid piston member 82. When the rotary member 5c is rotated, the communication between the first and second valve ports 5b and 5d varies from "fully open" to "fully closed". When the piston member 82 is moved to the leftmost as shown in FIG. 2, the communication in the clutch valve 5 is "fully open", while as the piston member 82 moves to the right, the communication varies gradually to "fully closed".

Because the first valve port 5b communicates with the first line La and the second valve port 5d communicates with the second line Lb constituting the hydraulic closed-circuit, the variation in the communication between the aforesaid first and second valve ports 5b and 5d can change the opening degree of the seventh line Lg or the short circuit line of the first and second lines La and Lb, thus effecting clutch control. In other words, based on signals from the controller 100, duty-ratio control of aforesaid solenoid valves 155 and 156 can perform a successful clutch control.

The primary purpose of this clutch control is to provide smooth start/stopping and thus the control is conducted mainly at the time of starting and stopping. However, as stated above, it also functions as a slip protection means for the driving wheel $W_1$. Namely, as the wheel $W_1$ is detected slipping, the solenoid valves 155 and 156 are subjected to the duty ratio control in response to the signal from the controller 100 in accordance with the slip rate, resulting in opening the clutch valve 5 by an amount necessary for the control. This permits the working fluid, pressurized in the first hydraulic line La due to the driving of the driving wheel $W_1$ to flow into the less pressurized second hydraulic line Lb via the clutch valve 5 to lower the pressure in the first hydraulic line La. Thus, the driving force of the driving wheel $W_1$, and hence also the slip thereof, is reduced. In other words, the clutch valve 5 capable of such control serves not only as a clutch means but also as a hydraulic pressure control apparatus that lowers the hydraulic pressure in the driving hydraulic line when the driving wheel has slipped.

With the above control, when the frictional coefficient of the road surface is small and the driving force of a wheel is greater than the driving load determined by the frictional force, causing slip between them, the slip will be detected by the slip sensor, and the hydraulic pressure in the hydraulic circuit will be lowered in accordance with the detected slip rate to reduce the driving force of the wheel to be less than the slip limit thereof. Accordingly, further slip of the wheel is prevented keeping the gripping force of the driving wheels as high as possible.

What is claimed is:

1. A control apparatus for a continuously variable speed transmission for a vehicle having a hydraulic pump connected to an engine, a hydraulic motor connected to driving wheels, and a hydraulic closed circuit hydraulically connecting said hydraulic pump with said hydraulic motor, said hydraulic closed circuit comprising a first hydraulic line through which a delivery port of said pump communicates with a suction port of said motor and a second hydraulic line through which a suction port of said pump communicates with a delivery port of said motor, at least one of said hydraulic pump and said hydraulic motor being a variable displacement type, the control apparatus comprising:

a slip detecting means for detecting slip of the driving wheels driven by said hydraulic motor, and hydraulic control means for lowering hydraulic pressure in said hydraulic closed circuit in accordance with a magnitude of the slip detected by said slip detecting means, in such a way that driving force applied to said driving wheels is reduced so as to be less than a slip limit force, the slip of said driving wheels being increased when the driving force applied to said driving wheels exceeds said slip limit force.

2. A control apparatus as defined in claim 1, wherein said slip detecting means comprises a front wheel speed sensor, a rear wheel speed sensor and means to calculate a slip rate based on a difference between a front wheel speed detected by said front wheel speed sensor and a rear wheel speed detected by said rear wheel speed sensor.

3. A control apparatus as defined in claim 1, wherein said hydraulic control means controls the hydraulic pressure in said first hydraulic line when said hydraulic motor drives said driving wheels.

4. A control apparatus as defined in claim 1 wherein said hydraulic control means controls the hydraulic pressure in said second hydraulic line when said hydraulic motor is driven by a driving force of said driving wheels with said hydraulic pump being driven by hydraulic pressure supplied from said hydraulic motor.

5. A control apparatus as defined in claim 1, wherein said hydraulic control means includes a pressure control means for controlling the hydraulic pressure in a one of said first and second hydraulic lines having a higher pressure by controlling a leakage flow of hydraulic fluid from said one of the two hydraulic lines to the other of the two hydraulic lines.

6. A control apparatus as defined in claim 1, wherein said hydraulic control means includes a clutch valve to adjust an opening of a bypass line which connects said first hydraulic line with said second hydraulic line.

7. A control apparatus as defined in claim 2, wherein said hydraulic control means controls the hydraulic pressure in said first hydraulic line when said hydraulic motor drives said driving wheels.

8. A control apparatus as defined in claim 2, wherein said hydraulic control means controls the hydraulic pressure in said second hydraulic line when said hydraulic motor is driven by driving force of said driving wheels with said hydraulic pump being driven by hydraulic pressure supplied from said hydraulic motor.

9. A control apparatus as defined in claim 5, wherein said pressure control means comprises a clutch valve to control a magnitude of opening of a bypass line through which said first hydraulic line communicates with said second hydraulic line.

* * * * *